(12) United States Patent
Ekbote et al.

(10) Patent No.: US 10,517,152 B2
(45) Date of Patent: Dec. 24, 2019

(54) POWER CONVERTER CIRCUITRY WITH IMPROVED CONTROL SCHEME

(71) Applicant: IDEAL Industries Lighting LLC, Sycamore, IL (US)

(72) Inventors: Ashish Ekbote, Carpinteria, CA (US); Noe Gonzalez, Santa Barbara, CA (US)

(73) Assignee: IDEAL Industries Lighting LLC, Sycamore, IL (US)

( * ) Notice: Subject to any disclaimer, the term of this patent is extended or adjusted under 35 U.S.C. 154(b) by 172 days.

(21) Appl. No.: 15/352,062

(22) Filed: Nov. 15, 2016

(65) Prior Publication Data

US 2018/0139811 A1    May 17, 2018

(51) Int. Cl.
| | |
|---|---|
| *H05B 33/08* | (2006.01) |
| *H02M 3/335* | (2006.01) |
| *H02M 1/44* | (2007.01) |
| *H02M 1/00* | (2006.01) |
| *H02M 1/32* | (2007.01) |
| *H02M 1/36* | (2007.01) |

(52) U.S. Cl.
CPC .......... *H05B 33/0815* (2013.01); *H02M 1/44* (2013.01); *H02M 3/33515* (2013.01); *H02M 3/33523* (2013.01); *H02M 1/32* (2013.01); *H02M 1/36* (2013.01); *H02M 2001/0009* (2013.01); *Y02B 20/346* (2013.01)

(58) Field of Classification Search
CPC ......... H02M 3/33523; H02M 3/33515; H02M 2001/0009; H02M 1/44; H05B 33/0815; H05B 33/0845

USPC ......................................... 315/291, 122, 186
See application file for complete search history.

(56) References Cited

U.S. PATENT DOCUMENTS

| | | | | |
|---|---|---|---|---|
| 2003/0128555 | A1* | 7/2003 | Schemmann ....... | H02M 3/3385 363/16 |
| 2015/0318784 | A1* | 11/2015 | Wu ....................... | H02M 3/158 323/283 |
| 2015/0334795 | A1* | 11/2015 | Strijker .............. | H05B 33/0815 315/291 |

* cited by examiner

*Primary Examiner* — Douglas W Owens
*Assistant Examiner* — Amy X Yang
(74) *Attorney, Agent, or Firm* — Withrow & Terranova, P.L.L.C.

(57) ABSTRACT

A method of operating a switching power converter includes operating the switching power converter in a boundary conduction mode when a switching frequency of a switch in the switching power converter is below a switching frequency threshold such than an on time of the switch is adjusted based on a desired output power of the switching power converter, and operating the switching power converter in a discontinuous conduction mode when the switching frequency of the switch is above the switching frequency threshold such that one or more of the on time of the switch and a switching period of the switch are adjusted based on the desired output power of the switching power converter and the on time of the switch is clamped at a minimum switch on time.

20 Claims, 10 Drawing Sheets

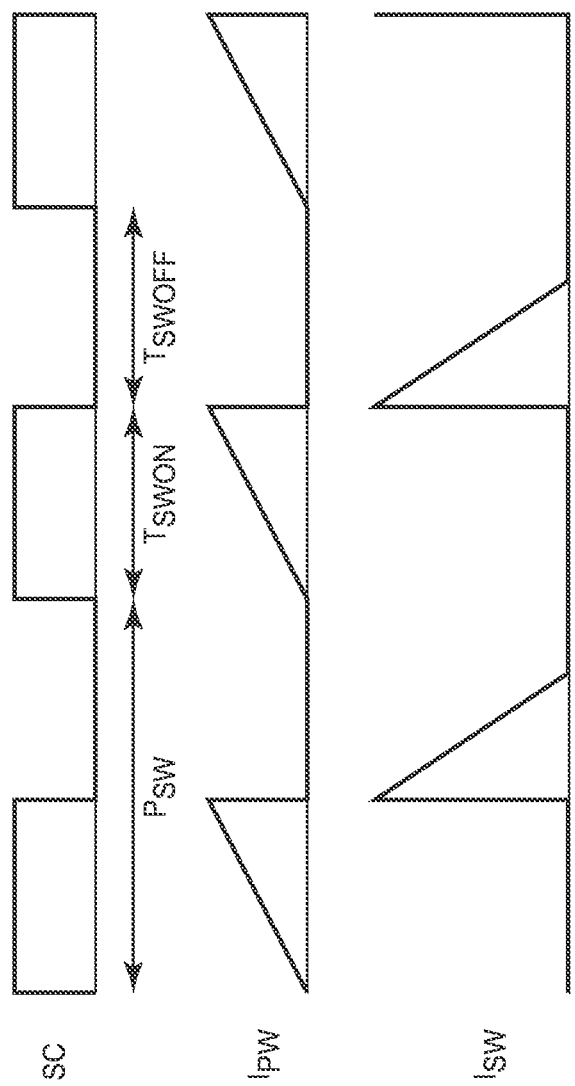

POWER CONVERTER CIRCUITRY WITH IMPROVED CONTROL SCHEME

FIELD OF THE DISCLOSURE

The present disclosure relates to power converter circuitry, and in particular to control schemes for a switching power converter.

BACKGROUND

Power converter circuitry is used in a variety of applications to convert and/or condition power from an input source in order to provide a desired output voltage and output current. While there are many different types of power converter circuitry, one type that is currently in widespread use is the switching power converter. Switching power converters include at least one switch, which is used to selectively deliver power from an input source to one or more additional components therein to provide a desired output voltage and output current. Control circuitry for a switching power converter provides control signals to the switch to change the output voltage, the output current, or both.

A conventional switching power converter 10 is shown in FIG. 1 for purposes of illustration. The conventional switching power converter 10 is a single-ended primary-inductor converter (SEPIC) including a transformer 12, a switch 14, a diode 16, and a capacitor 18. The transformer 12 includes a primary winding 20A coupled between an input node 22 and the switch 14 and a secondary winding 20B coupled between an anode of the diode 16 and ground. The switch 14 is coupled between the primary winding 20A and ground. The cathode of the diode 16 is coupled to an output node 24. The capacitor 18 is coupled between the output node 24 and ground.

Power converter control circuitry 26 is coupled to the switch 14, and may also be coupled to the input node 22 and the output node 24 in order to receive feedforward and feedback signals therefrom. In operation, the power converter control circuitry 26 provides a switching control signal SC to the switch 14. The switch 14 may be a transistor such as a field-effect transistor (FET) including a gate (G) a drain (D), and a source (S). The switching control signal SC may be provided to the gate (G) of the switch 14 in order to control the amount of current flowing from the drain (D) to the source (S) thereof. When the switch 14 is closed (ON), a primary winding current $I_{PW}$ flows through the primary winding 20A. The current through the primary winding 20A induces a reverse current in the secondary winding 20B. This reverse current is blocked by the diode 16, and energy therefore accumulates in a magnetic field of the transformer 12. When the switch 14 is open (OFF), current does not flow through the primary winding 20A, and the magnetic field of the transformer 12 collapses such that a secondary winding current $I_{SW}$ is provided through the diode 16 to the output node 24. This secondary winding current $I_{SW}$ charges the capacitor 18, which sources voltage and current to the output node 24 both when the switch 14 is open and closed in order to reduce ripple in the output voltage and/or output current.

Switching power converters can be operated in several different modes. In a continuous conduction mode (CCM), the switch control signal SC is provided such that when the switch 14 is opened, the secondary winding current $I_{SW}$ does not fall to zero before the switch 14 is closed again. In a discontinuous conduction mode (DCM), the switch control signal SC is provided to the switch 14 such that when the switch 14 is opened, the secondary winding current $I_{SW}$ falls to and stays at zero for some period of time (i.e., "dead time") before the switch 14 is closed again. In a boundary conduction mode (BCM), the switch control signal SC is provided such that when the switch 14 is opened and the secondary winding current $I_{SW}$ reaches zero, the switch 14 is immediately closed again.

Waveforms illustrating the continuous conduction mode (CCM), the discontinuous conduction mode (DCM), and the boundary conduction mode (BCM) are shown in FIGS. 2A-2C, respectively. In these figures, the switch control signal SC is shown along with the primary winding current $I_{PW}$ and the secondary winding current $I_{SW}$. When the switch control signal SC is high, the switch 14 is closed. When the switch control signal SC is low, the switch 14 is open. As discussed herein, the amount of time the switch control signal SC is high and thus the amount of time the switch 14 is closed is the on time $T_{SWON}$ of the switch 14. The amount of time the switch control signal SC is low and thus the amount of time the switch 14 is open is the off time $T_{SWOFF}$ of the switch 14. The combined on time $T_{SWON}$ and off time $T_{SWOFF}$ of the switch 14 defines a switching period $P_{SW}$.

Conventionally, power converter control circuitry has been designed using analog components. The resulting analog control circuitry was often complex and consumed a large amount of space. Recently, there has been a trend towards digital control circuitry for switched power converters. Digital control circuitry such as a microcontroller can provide the switch control signal SC using pulse-width modulation (PWM). While using digital control circuitry in this manner may result in reduced complexity and saved space, there are several issues with doing so, especially when the digital control circuitry is to be used with a switching power converter for a light-emitting diode (LED) light.

Generally, it is desirable for LED lights to be dimmable across a large range of values (e.g., from 5% to 100% of their brightness capability). In order to provide this dimming capability, a switching power converter used in an LED lighting application must be capable of supplying output voltage and/or output current across a relatively large range of values. When operated in a boundary conduction mode (BCM) as discussed above, the power converter control circuitry 26 provides the switch control signal SC to adjust the on time of the switch 14, which in turn provides a desired output voltage and/or output current from the conventional switching power converter 10. The off time of the switch 14 is set implicitly, as it is controlled by the amount of time it takes for the secondary winding current $I_{SW}$ to reach zero after the switch 14 is turned off. In such an approach, the on time of the switch 14 may become very small when attempting to provide a low output voltage and/or output current in order to achieve desired dimming of an LED light. This small on time necessitates a high switching speed and thus a high frequency of operation of PWM circuitry that may be used to provide the switching control signal SC in digital control circuitry. Further, such high-frequency switching demands high-resolution PWM circuitry in order to set the on time of the switch 14 with a desired amount of precision. The resolution of the PWM circuitry becomes increasingly important as the switching frequency increases. Often, the cost and complexity of digital controllers such as microcontrollers increases in proportion to the speed and resolution of PWM circuitry therein. Since switching power converters for LED lights may require relatively high switching frequencies as discussed above, using digital control circuitry therewith may be cost prohibitive.

One way to solve the aforementioned problems is by operating the conventional switching power converter 10 in a discontinuous conduction mode (DCM) as discussed above. Accordingly, the power converter control circuitry 26 provides the switch control signal SC such that the on time of the switch 14 remains constant while the off time thereof is adjusted. Such a control scheme allows the conventional switching power converter 14 to provide a very low output voltage and/or output current and thus achieve a desired level of dimming for an LED light. However, the switching frequency risks becoming too low in a discontinuous conduction mode (DCM) at which point the circuitry may produce undesirable audible noise.

Another way to solve the aforementioned problems is using frequency limiting, in which the switching frequency of the switch 14 is clamped on the high end, the low end, or both. Such frequency limiting is often used along with analog controllers. However, clamping the switching frequency of the switch 14 limits the range of output voltage and/or output current of the conventional switching power converter 10 and thus the dimming capability of an LED light used therewith. In addition to frequency limiting, burst operating modes may also be used wherein entire switching periods are skipped in order to provide the output voltage and/or output current at a desired level. However, burst operating modes may also introduce audible noise and/or ripple in the output voltage and/or output current.

In light of the above, there is a need for power converter circuitry with an improved control scheme such that the power converter circuitry can be used with digital control circuitry while providing a large output voltage and/or output current range suitable for LED lighting applications.

SUMMARY

The present disclosure relates to power converter circuitry, and in particular to control schemes for a switching power converter. In one embodiment, a method of operating a switching power converter includes operating the switching power converter in a boundary conduction mode when a switching frequency of a switch in the switching power converter is below a switching frequency threshold such than an on time of the switch is adjusted based on a desired output power of the switching power converter, and operating the switching power converter in a discontinuous conduction mode when the switching frequency of the switch is above the switching frequency threshold such that one or more of the on time of the switch and a switching period of the switch are adjusted based on the desired output power of the switching power converter and the on time of the switch is clamped at a minimum switch on time. By operating in the critical conduction mode when the switching frequency of the switch is below the switching frequency threshold and transitioning to the discontinuous conduction mode when the switching frequency of the switch is above the switching frequency threshold, the switching frequency of the switch may be limited, thereby relaxing the requirements on power converter control circuitry for the switching power converter.

In one embodiment, control circuitry for a switching power converter includes processing circuitry and a memory. The memory stores instructions, which, when executed by the processing circuitry cause the control circuitry to provide a power converter control signal to the switching power converter in order to operate the switching power converter in a boundary conduction mode when a switching frequency of a switch in the switching power converter is below a switching frequency threshold such that an on time of the switch is adjusted based on a desired output power of the switching power converter, and provide the power converter control signal to the switching power converter in order to operate the switching power converter in a discontinuous conduction mode when the switching frequency of the switch is above the switching frequency threshold such that one or more of the on time of the switch and a switching period of the switch are adjusted based on the desired output of the switching power converter and the on time of the switch is clamped at a minimum switch on time. By operating in the critical conduction mode when the switching frequency of the switch is below the switching frequency threshold and transitioning to the discontinuous conduction mode when the switching frequency of the switch is above the switching frequency threshold, the switching frequency of the switch may be limited, thereby relaxing the requirements on power converter control circuitry for the switching power converter.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIGS. 2A through 2C are diagrams illustrating a number of control schemes that may be used for a switching power converter.

DETAILED DESCRIPTION

Figure 1:
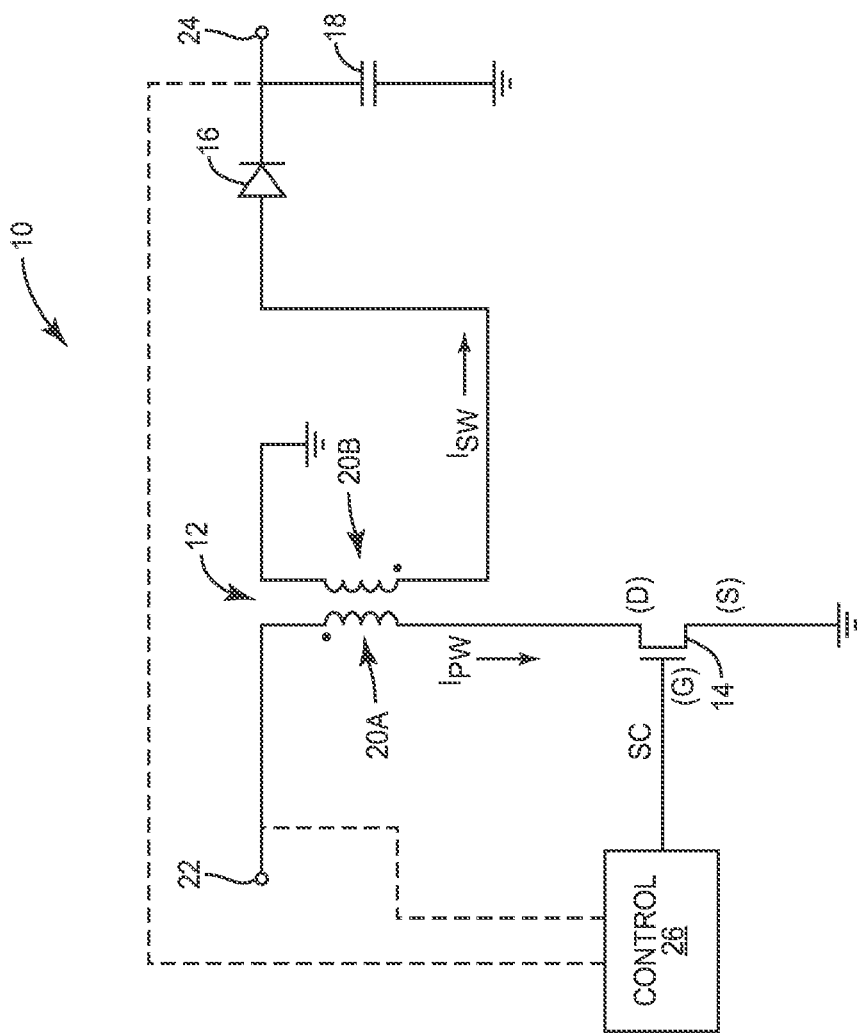
FIG. 1 is a functional schematic illustrating a conventional switching power converter.
Figure 2A:
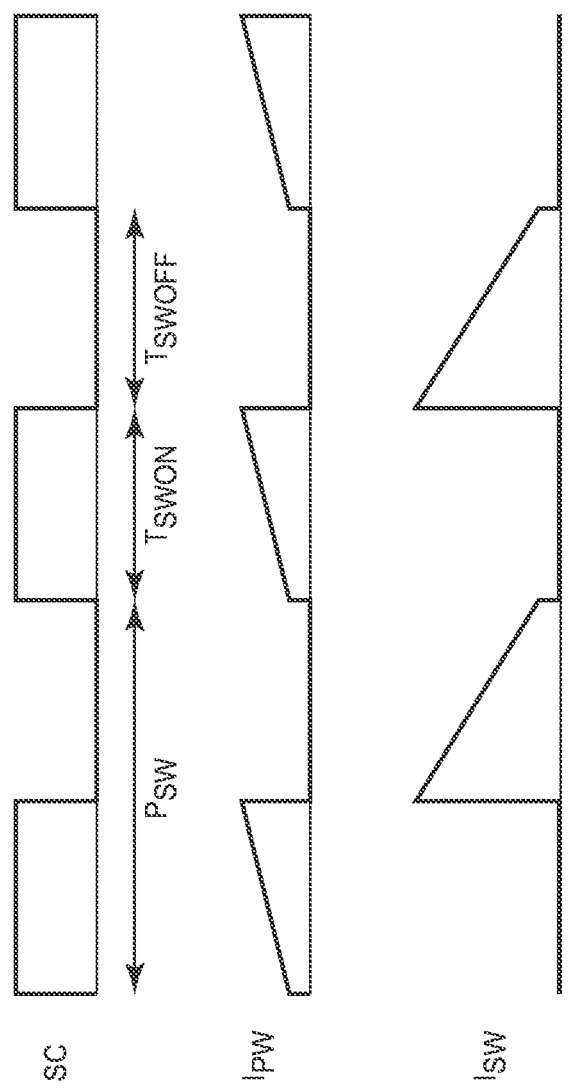
Figure 2C:
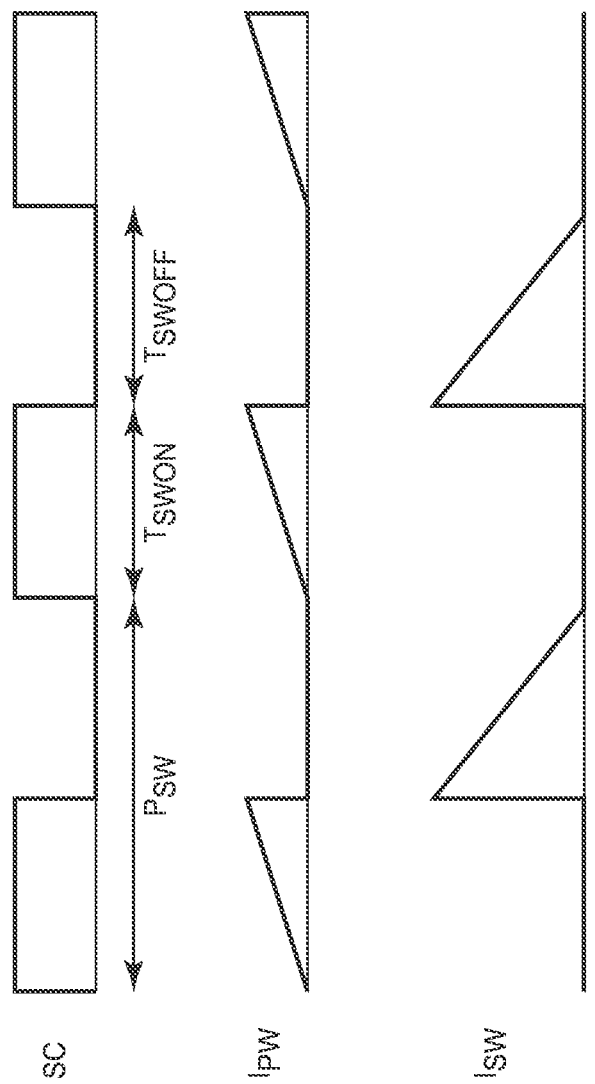

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 3:
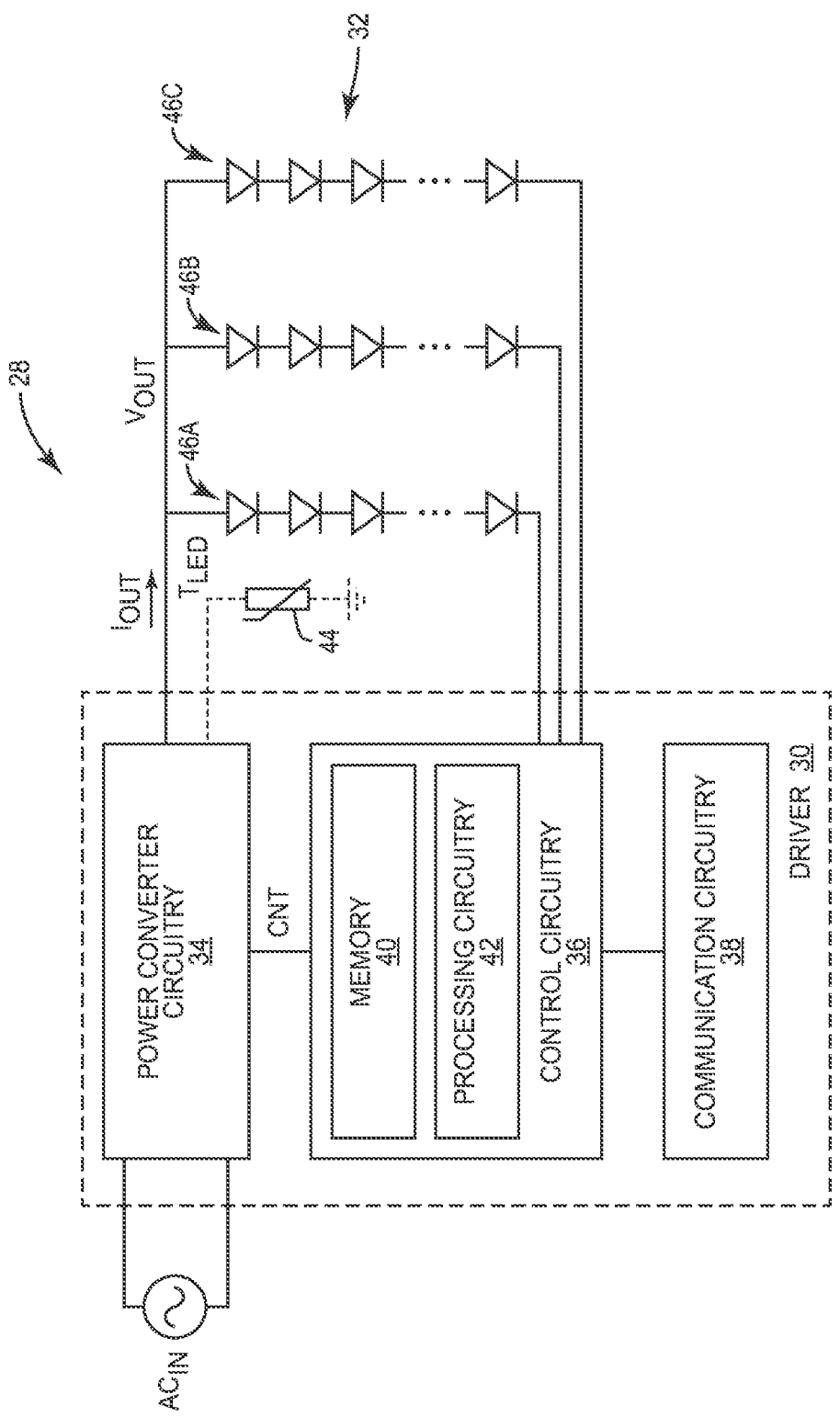
FIG. 3 is a functional schematic illustrating a light-emitting diode (LED) light according to one embodiment of the present disclosure.

FIG. 3 shows a light-emitting diode (LED) light 28 according to one embodiment of the present disclosure. The LED light 28 includes driver circuitry 30 and an LED array 32. The driver circuitry 30 includes power converter circuitry 34, control circuitry 36, and communications circuitry 38. The control circuitry 36 includes a memory 40 and processing circuitry 42, and provides the main intelligence of the LED light 28. Using the processing circuitry 42 to execute instructions stored in the memory 40, the control circuitry 36 may change the light output of the LED array 32, communicate with other lights and/or appliances via the communications circuitry 38, and perform other desired functions.

The control circuitry 36 provides a control signal CNT to the power converter circuitry 34, which is used by the power converter circuitry 34 along with one or more other signals to convert and/or condition an alternating current (AC) input power source $AC_{IN}$ in order to provide an output voltage $V_{OUT}$ and an output current $I_{OUT}$ as discussed below. In particular, the control signal CNT may be provided based on a desired light level or light characteristic from the LED array 32, such that the power converter circuitry 34 then provides the output voltage $V_{OUT}$ and the output current $I_{OUT}$ in order to meet these parameters. A temperature sensor 44 may be provided near the LED array 32 and used to monitor an LED temperature $T_{LED}$, which may be used at least in part to determine the output voltage $V_{OUT}$ and the output current $I_{OUT}$ necessary to provide light from the LED array 32 with one or more desired parameters.

The LED array 32 may include multiple LED strings 46. Each of the LED strings 46 may include LEDs having different characteristics. For example, a first one of the LED strings 46A may include blue-shifted yellow (BSY) LEDs, a second one of the LED strings 46B may include blue-shifted green (BSG) LEDs, and a third one of the LED strings 46C may include red (R) LEDs. The control circuitry 36 may be configured to individually regulate the amount of the output current $I_{OUT}$ from the power converter circuitry 34 passing through each one of the LED strings 46 such that the light from each one of the LED strings 46 combines to produce light having a desired intensity, color, color temperature, color rendering index, or any other parameter. While shown as multiple LED strings 46, the LED array 32 may be arranged in any suitable manner without departing from the principles herein. For example, the LED array 32 may include any number of LED strings 46 including the same or different types and colors of LEDs. Further, the LED strings 46 may include any number of series and/or parallel connected LEDs. Further, the LEDs themselves may be any type of LEDs and any color of LEDs, and may include phosphor-converted LEDs (e.g., phosphor converted red LEDs).

Figure 4:
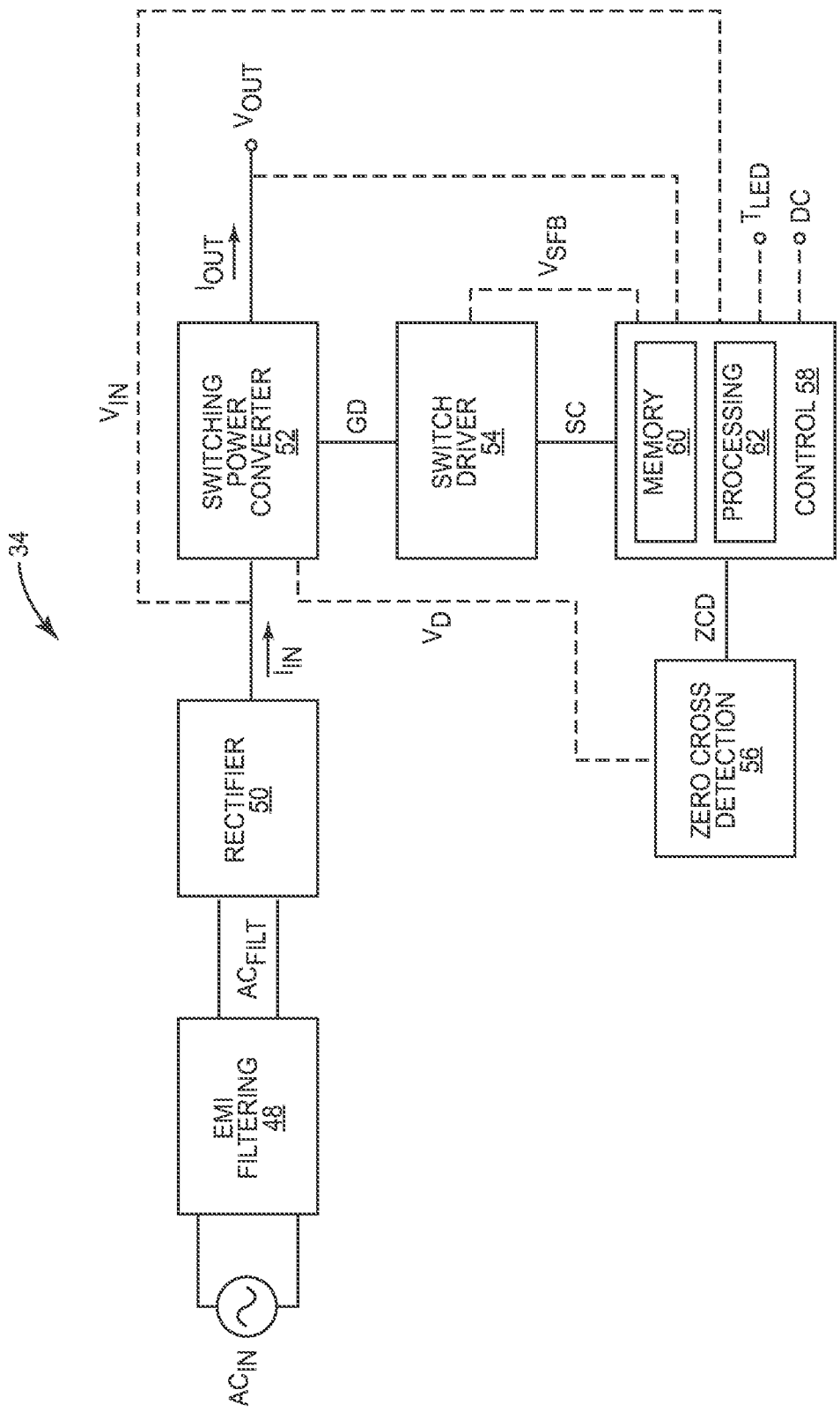
FIG. 4 is a functional schematic illustrating power converter circuitry according to one embodiment of the present disclosure.

As discussed above, the LED light 28 may require the power converter circuitry 34 to provide the output voltage $V_{OUT}$ and output current $I_{OUT}$ over a relatively wide range of values in order to support a full range of dimming of the LEDs in the LED array 32. Accordingly, FIG. 4 shows the power converter circuitry 34 according to one embodiment of the present disclosure. The power converter circuitry 34 includes electromagnetic interference (EMI) filtering circuitry 48, rectifier circuitry 50, a switching power converter 52, switch driver circuitry 54, zero cross detection (ZCD) circuitry 56, and power converter control circuitry 58. The EMI filtering circuitry 48 is coupled between an AC input power source and the rectifier circuitry 50, which is in turn coupled to the switching power converter 52. The switch driver circuitry 54 is coupled between the power converter control circuitry 58 and the switching power converter 52. The ZCD circuitry 56 is coupled to the power converter control circuitry 58.

The EMI filtering circuitry 48 is configured to receive an input voltage and an input current from the AC input power source $AC_{IN}$ and provide a filtered AC input signal $AC_{FILT}$ relatively free of EMI to the rectifier circuitry 50. The rectifier circuitry 50 is configured to rectify the filtered AC input signal $AC_{FILT}$ to provide a direct current (DC) input voltage $V_{IN}$ and input current $I_{IN}$. The ZCD circuitry 56 is configured to detect when a secondary winding current $I_{SW}$ in the switching power converter 52 falls to zero, and indicate said zero crossing to the power converter control circuitry 58 via a zero crossing detection signal ZCD. The power converter control circuitry 58 includes a memory 60 and processing circuitry 62 and is configured to receive the zero crossing detection signal ZCD, the dimming control signal DC, the LED temperature $T_{EED}$, the input voltage $V_{IN}$ and/or input current 6, the output voltage $V_{OUT}$ and/or output current $I_{OUT}$, and a switch feedback voltage $V_{SFB}$ and provide a switch control signal SC to the switch driver circuitry 54 based thereon. Specifically, the processing circuitry 62 is configured to execute instructions stored in the memory 60 in order to process the various input signals and provide the switch control signal SC as discussed in detail below to provide light from the LED array 32 having one or more desired characteristics. The switch driver circuitry 54 is configured to provide a gate drive signal GD sufficient to drive one or more switches to the switching power converter based on the switch control signal SC in order to control the state thereof. The switching power converter 52 is configured to provide the output voltage $V_{OUT}$ and the output current $I_{OUT}$ based on the gate drive signal GD.

In some embodiments, the switching power converter 52 is a very high frequency (VHF) switching power converter configured to operate at switching speeds greater than or equal to 1 MHz when providing a maximum output voltage $V_{OUT}$ and/or output current $I_{OUT}$. Using a VHF switching power converter may provide several benefits such as reduced size (e.g., up to a 65% reduction in size when compared to conventional power converter circuitry), increased power density (e.g., 1.5× conventional power converter circuitry), and increased efficiency.

Figure 5:
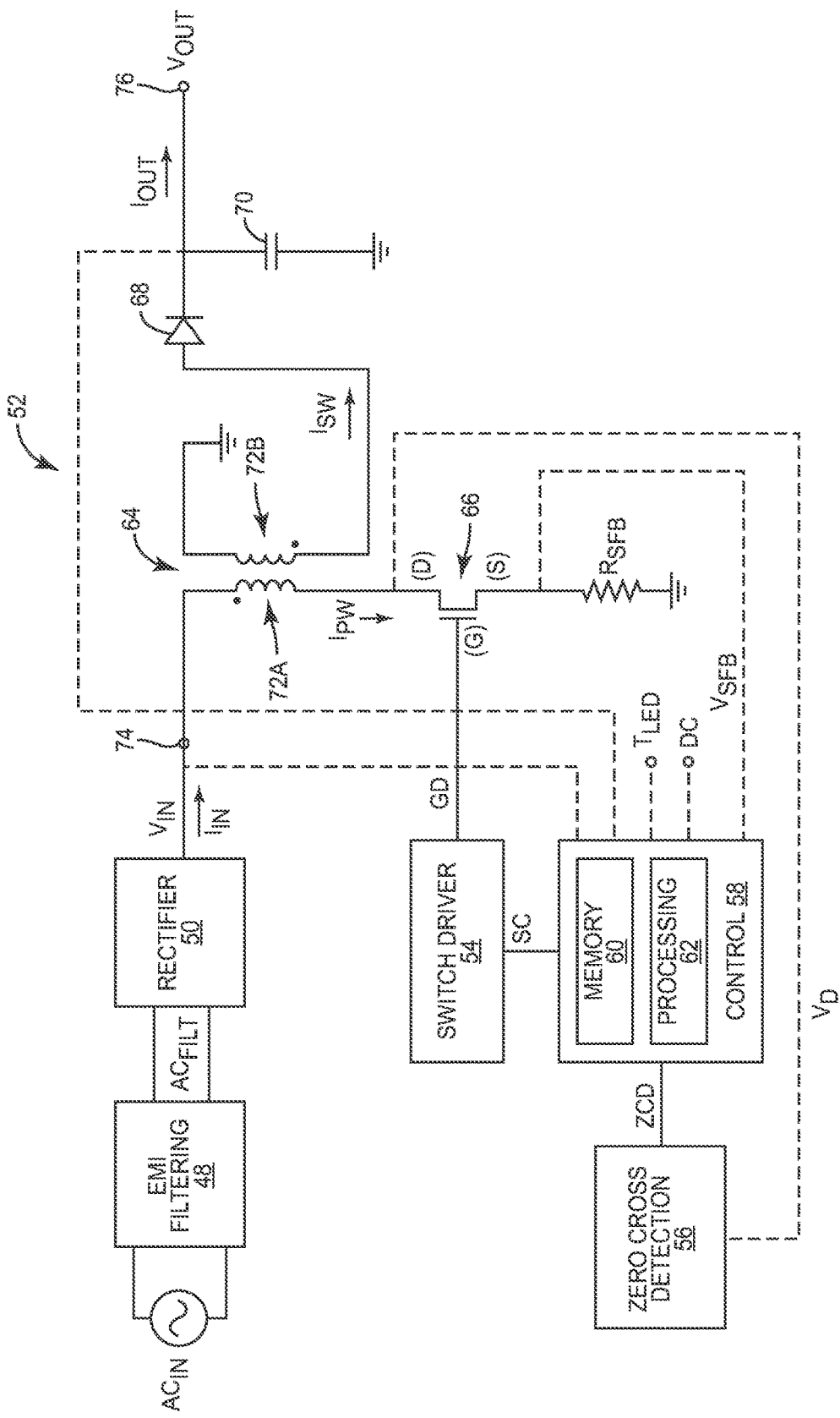
FIG. 5 is a functional schematic illustrating power converter circuitry according to one embodiment of the present disclosure.

The switching power converter 52 may be any suitable type of switching power converter. For example, the switching power converter 52 may be a single-ended primary-inductor converter (SEPIC). Those skilled in the art will appreciate that the principles of the present disclosure apply to any number of different switching power converter topologies (e.g., boost converters, buck converters, buck-boost converters, PFC converters, and the like), all of which are contemplated herein. Details of one exemplary topology for the switching power converter 52 are shown in FIG. 5. The switching power converter 52 includes a transformer 64, a switch 66, a diode 68, and a capacitor 70. The transformer 64 includes a primary winding 72A coupled between an input node 74 and the switch 66 and a secondary winding 72B coupled between an anode of the diode 68 and ground. The switch 66 is coupled between the primary winding 72A and a switch feedback resistor $R_{SFB}$, which is in turn coupled to ground. The cathode of the diode 68 is coupled to an output node 76. The capacitor 70 is coupled between the output node 76 and ground.

The switch 66 may be a transistor such as a field-effect transistor (FET) including a gate (G), a drain (D), and a source (S). The switch driver circuitry 54 may be coupled to the gate (G) of the switch 66, such that the gate drive signal GD provided thereto controls the amount of current flowing from the drain (D) to the source (S). When the switch 66 is closed (ON), current flows through the primary winding 72A. This current generates switch feedback voltage $V_{SFB}$ across the switch feedback resistor $R_{SFB}$, which is detected by the power converter control circuitry 58. Further, the current through the primary winding 72A induces an opposite current in the secondary winding 72B. This reverse current is blocked by the diode 68, and energy therefore accumulates in the magnetic field of the transformer 64. When the switch 66 is open (OFF), current does not flow through the primary winding 72A, and the magnetic field of the transformer 64 collapses such that a forward current is provided through the diode 68 to the output node 76. This forward current charges the capacitor 70, which sources current to the output node 76 both when the switch 66 is open and closed in order to reduce ripple in the output voltage and/or output current.

As discussed above, the power converter circuitry 34 may be VHF power converter circuitry configured to operate at high switching speeds greater than or equal to 1 MHz when delivering the output voltage $V_{OUT}$ and/or output current $I_{OUT}$ above a certain threshold. Operating at these high frequencies allows the size of the magnetic components in the power converter circuitry 34 to be significantly reduced. For example, the size of the transformer 64 may be significantly reduced in some embodiments. In one embodiment, the reduced size of the magnetic components enables the power converter circuitry 34 to be rated for 30 W output power for an input voltage between 120 V and 277 V with a size of 8.06"×0.75"×0.5" for an overall area of 6.09 in$^2$, a volume of 3.04 in$^3$, and a power density (at 30 W) of 8.97 W/in$^3$.

In order to operate at high switching speeds greater than or equal to 1 MHz when delivering the output voltage $V_{OUT}$ and the output current $I_{OUT}$ above a certain threshold, the switch 66 may be a silicon carbide (SiC) metal-oxide-semiconductor field-effect transistor (MOSFET). Those skilled in the art will appreciate that such a device is capable of operating at very high switching speeds with very little switching losses and thus high efficiency.

In addition to the switch 66, the transformer 64 may also be specifically designed for high frequency operation. In one embodiment, a core of the transformer 64 comprises powdered iron, which provides a distributed gap in order to prevent fringing flux and reduce hot spots. The transformer 64 may be toroidal, which provides a closed magnetic loop and optimized winding efficiency. The primary winding 72A and the secondary winding 72B may be in a bi-filar fashion (alternating stripes) in order to minimize parasitic capacitance. The primary winding 72A may be thicker than the secondary winding 72B in order to reduce losses in the transformer 64.

Details of the EMI filtering circuitry 48, the rectifier circuitry 50, the switch driver circuitry 54, the ZCD circuitry 56, and the power converter control circuitry 58 will be appreciated by those skilled in the art. Those skilled in the art will appreciate that the principles of the present disclosure apply to power converter circuitry with any number of different configurations for the EMI filtering circuitry 48, the rectifier circuitry 50, the switch driver circuitry 54, the ZCD circuitry 56, and the power converter control circuitry 58, all of which are contemplated herein. Further, any one of the EMI filtering circuitry 48, the rectifier circuitry 50, the switch driver circuitry 54, and the ZCD circuitry 56 may be omitted and/or combined with one or more other components in the power converter circuitry 34 without departing from the principles described herein. Using the control schemes described herein, the power converter control circuitry 58 may be implemented in any number of off-the-shelf microcontrollers. Further, because of the operation of the power converter control circuitry 58 discussed below, the performance requirements of these off-the-shelf microcontrollers may be significantly reduced in order to allow cheaper and widely available parts to be used for the power converter control circuitry 58.

Figure 6:
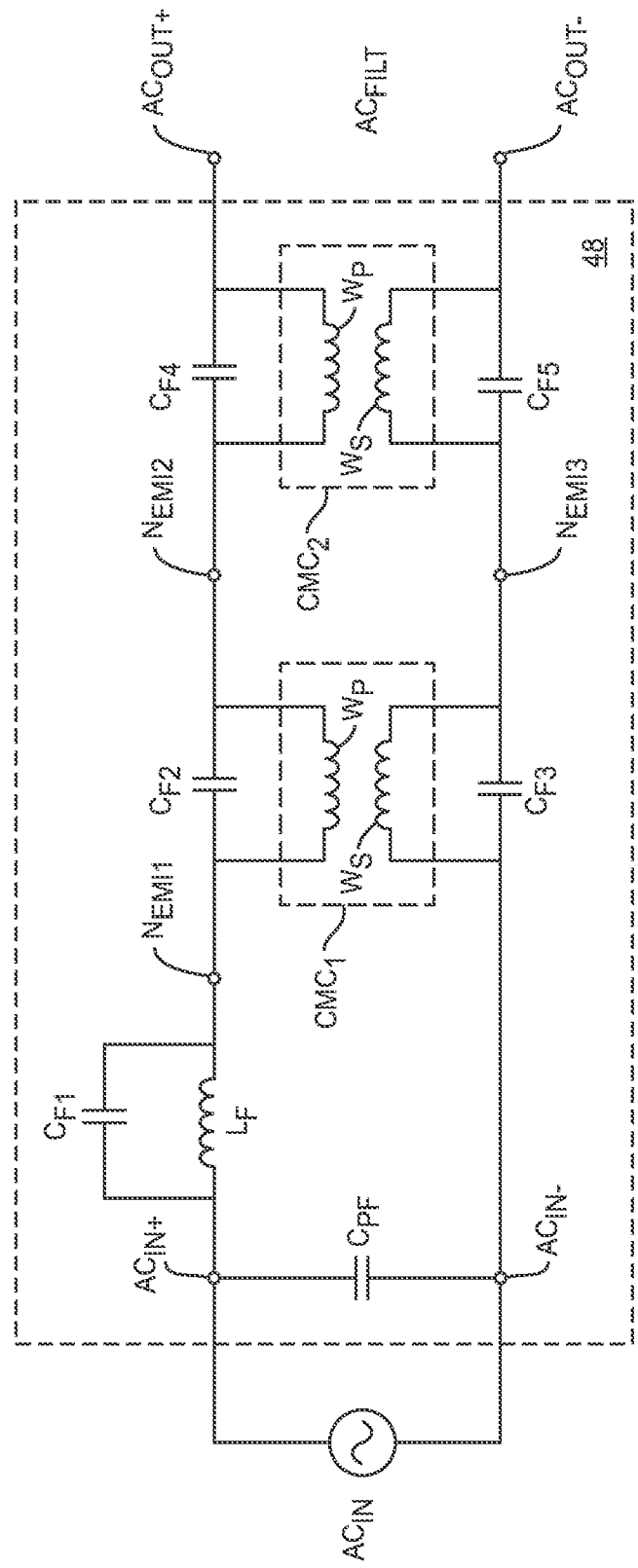
FIG. 6 is a functional schematic of electromagnetic interference (EMI) filtering circuitry according to one embodiment of the present disclosure.

Details of exemplary EMI filtering circuitry 48 are shown in FIG. 6 according to one embodiment of the present disclosure. The EMI filtering circuitry 48 includes a positive AC input node $AC_{IN+}$, a negative AC input node $AC_{IN-}$, a positive AC output node $AC_{OUT+}$, and a negative AC output node $AC_{OUT-}$. The AC input power source $AC_{IN}$ is coupled between the positive AC input node $AC_{IN+}$ and the negative AC input node $AC_{IN-}$. A parallel filtering capacitor $C_{PF}$ is coupled in parallel with the AC input power source $AC_{IN}$ between the positive AC input node $AC_{IN+}$ and the negative AC input node $AC_{IN-}$. A first filtering capacitor $C_{F1}$ is coupled in parallel with a filtering inductor $L_F$ between the positive AC input node $AC_{IN+}$ and a first EMI intermediate node $N_{EMI1}$. A first common mode choke $CMC_1$ is coupled in the signal path of the EMI filtering circuitry 48 such that a primary common mode choke winding $W_P$ of the first common mode choke $CMC_1$ is coupled in parallel with a second filtering capacitor $C_{F2}$ between the first EMI intermediate node $N_{EMI1}$ and a second EMI intermediate node $N_{EMI2}$ and a secondary common mode choke winding W S of the first common mode choke $CMC_1$ is coupled in parallel with a third filtering capacitor $C_{F3}$ between the negative AC input node $AC_{IN-}$ and a third EMI intermediate node $N_{EMI3}$. A second common mode choke $CMC_2$ is also coupled in the signal path of the EMI filtering circuitry 48 such that a primary common mode choke winding $W_P$ of the second common mode choke $CMC_2$ is coupled in parallel with a fourth filtering capacitor $C_{F4}$ between the second EMI intermediate node $N_{EMI2}$ and the positive AC output node $AC_{OUT+}$ and a secondary common mode choke winding $W_S$ of the second common mode choke $CMC_2$ is coupled in parallel with a fifth filtering capacitor $C_{F5}$ between the third EMI intermediate node $N_{EMI3}$ and the negative AC output node $AC_{OUT-}$. The filtered AC input signal $AC_{FILT}$ is provided between the positive AC output node $AC_{OUT+}$ and the negative AC output node $AC_{OUT-}$.

Each one of the filtering elements in the EMI filtering circuitry 48 may be designed to suppress noise within a particular frequency range. For example, the filtering inductor $L_F$ may be configured to suppress noise generated from a bias power supply in the power converter circuitry 34, and specifically may suppress noise occurring at frequencies less than 200.0 kHz. The first common mode choke $CMC_1$ may be designed to suppress noise occurring above 20.0 MHz. The second common mode choke $CMC_2$ may be configured to suppress noise occurring between 500.0 kHz and 2.0 MHz. While not shown, an additional filtering capacitor coupled between the input node 74 of the power converter circuitry 34 and ground may be configured to suppress noise occurring between 150.0 kHz and 2.0 MHz, and an additional filtering inductor coupled between the input node 74 of the power converter circuitry 34 and the primary winding 72A of the transformer 64 may be configured to suppress noise between 500 kHz and 2 MHz.

The materials chosen for each one of the filtering elements may determine the filter response provided thereby. In one embodiment, a magnetic material of the first filtering inductor $L_F$ and the additional inductor is part number C055285A2 from Mag-Inc. The magnetic material of the first common mode choke $CMC_1$ may be part number 3S4 or part number 4S2 from Ferroxcube. The magnetic material of the second common mode choke $CMC_2$ may be part number 3E6 from Ferroxcube.

Providing the EMI filtering circuitry 48 as discussed above may provide significant reductions in external noise provided in the filtered input signal $AC_{FILT}$, thereby improving the quality of the output voltage $V_{OUT}$ and the output current $I_{OUT}$ from the power converter circuitry 34.

Figure 7:
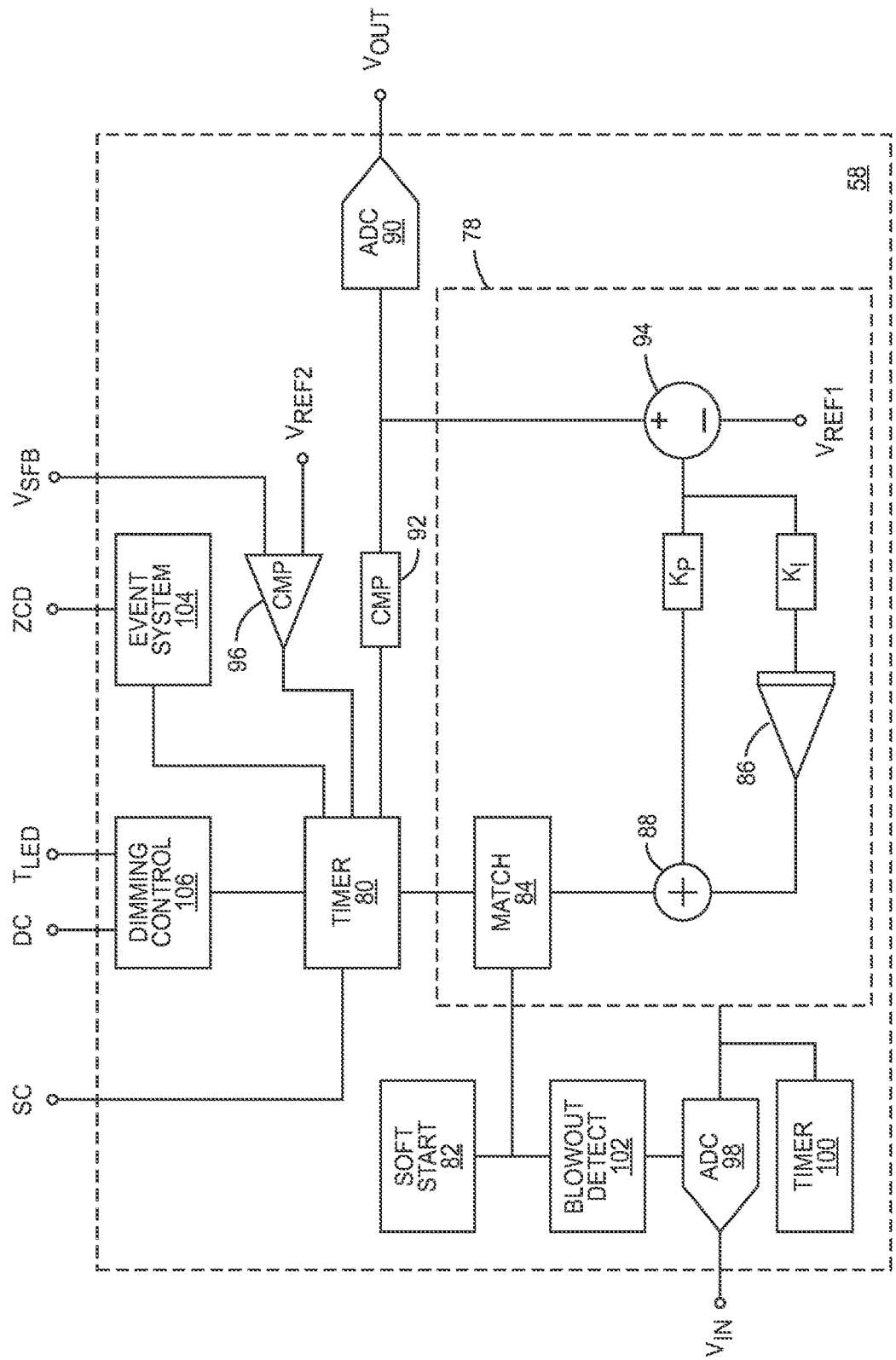
FIG. 7 is a functional schematic illustrating power converter control circuitry according to one embodiment of the present disclosure.

FIG. 7 is a functional schematic illustrating details of the power converter control circuitry 58 according to one embodiment of the present disclosure. Notably, the components of the power converter control circuitry 58 illustrated in FIG. 7 are functional and thus may be implemented in hardware, software, or some combination thereof. At a high level, the power converter control circuitry 58 is configured to receive the input voltage $V_{IN}$ and/or input current 6 or a scaled-down version thereof, the output voltage $V_{OUT}$ and/or the output current $I_{OUT}$ or a scaled-down version thereof, the switch feedback voltage $V_{SFB}$, the zero crossing detection signal ZCD, and the dimming control signal DC and provide the switch control signal SC to the switch driver circuitry 54 based thereon. The primary control mechanism for the power converter control circuitry 58 is a proportional integrator (PI) controller 78, which provides a control signal to a primary timer 80 responsible for providing the switch control signal SC.

As discussed below, the dynamics of the PI controller 78 do not allow the system to properly start up from a previously powered down state using only the PI controller 78. Accordingly, a soft-start module 82 is provided to allow the on-time of the switch control signal SC to rise with a proper slope until the point when the PI controller 78 can gain control of the system. To do so, the soft-start module 82 provides a counter to a match register 84 in the PI controller 78, where the match register 84 is used by the primary timer 80 to determine an on-time of the switch control signal SC. Specifically, the soft-start module 82 ramps up the value stored in the match register 84 at a desired rate so that the on-time of the switch control signal SC rises accordingly. The soft-start module 82 may further be responsible for setting values of a proportional factor $K_P$ and an integrator factor $K_I$ during startup of the power converter control circuitry 58 in order to further assist the PI controller 78 in gaining control of the system. For example, the proportional factor $K_P$ and the integrator factor $K_I$ may be set differently based on whether the system is in low-line operation in which a low input voltage $V_{IN}$ (e.g., between 108 V and 132 V) is received or a high-line operation in which a high input voltage $V_{IN}$ (e.g., between 253 V and 305 V) is received. Once the output of the PI controller loop (formed by the proportional factor $K_P$ and the integrator factor $K_I$, an integrator gain stage 86, and a PI adder 88) matches the counter provided by the soft-start module 82, the proportional factor $K_P$ and the integrator factor $K_I$ may be reset to their default values so that operation of the power converter control circuitry 58 may proceed normally.

In order to protect the switch 66 and other components in the power converter circuitry 34 from damage, over-voltage protection may be implemented using an output voltage analog-to-digital converter (ADC) 90, which receives the output voltage $V_{OUT}$ or a scaled-down version thereof and provides a digital value representative thereof to an output voltage comparator 92, which provides a turn-off signal to the primary timer 80 if the output voltage $V_{OUT}$ is above a predetermined threshold. When the turn-off signal is received at the primary timer 80, the switch control signal SC is terminated such that the power converter circuitry 34 is shut off.

The digital value representative of the output voltage $V_{OUT}$ is also provided to an error signal generator 94, which generates an error signal as the difference between the digital value and a first reference voltage $V_{REF1}$, which is fed into the PI control loop discussed above in order to populate the match register 84 and thus control the primary timer 80.

In addition to over-voltage protection, over-current protection may be implemented using an analog switch voltage comparator 96, which receives the switch feedback voltage $V_{SFB}$ and a second reference voltage $V_{REF2}$ and provides a turn-off signal to the primary timer 80 if the switch feedback voltage $V_{SFB}$ is above a predetermined threshold. When the turn-off signal is received at the primary timer 80, the switch control signal SC is terminated such that the power converter circuitry 34 is shut off.

In order to properly measure the input voltage $V_{IN}$ and the output voltage $V_{OUT}$, AC synchronization is implemented in the power converter control circuitry 58. This is done in two ways. First, the input voltage $V_{IN}$ is sensed by an input voltage ADC 98, which receives the input voltage $V_{IN}$ and provides a digital value representative thereof. The output voltage $V_{OUT}$ is sampled synchronously with the input voltage $V_{IN}$ in order to ensure that these voltages are properly measured at the same point in the AC cycle. This may involve sampling only when the input voltage falls below a predetermined threshold. A secondary method for AC synchronization is also provided which includes utilizing a secondary timer 100 to determine when to sample the input voltage $V_{IN}$ and/or the output voltage $V_{OUT}$ appropriately. The secondary timer 100 may be used when conditions prevent the proper synchronization of output voltage $V_{OUT}$ measurements based on the input voltage $V_{IN}$.

A brownout module 102 may be provided to completely shut down the system to avoid residual power events in the case of a short cool-down time. The brownout module 102 may ensure that upon shutdown of the system, the switching control signal SC is terminated such that the system is completely off, and the soft-start counter is reset to zero. This ensures that if the system is quickly turned off and then back on again, the soft-start procedures will engage and residual power in the switch 66 due, for example, to decay of the switching of a MOSFET, does not cause damage to the system components.

The zero crossing detection signal ZCD may be provided to an event system 104, which is interrupt driven. The zero crossing detection signal ZCD is triggered on a falling edge of current provided through the switch 66. Specifically, the zero crossing detection signal ZCD indicates when a current through the switch 66 has fallen to zero after the switch 66 has been turned on. When the zero crossing detection signal ZCD indicates that a falling edge has occurred, the event system 104 may reset the primary timer 80, thereby starting a new duty cycle in the switch control signal SC. Accordingly, when zero cross detection is enabled, the power converter control circuitry 58 provides the switch control signal SC such that the power converter circuitry 34 operates in a boundary conduction mode as discussed above.

A dimming module 106 ensures that the switching frequency of the switch 66 remains within a desired set of bounds to ensure proper operation of the power converter circuitry 34 while providing a desired output voltage $V_{OUT}$ and/or output current $I_{OUT}$ in order to provide a particular dimming level of LEDs driven thereby. The details of the dimming module 106 are discussed in detail below.

Figure 8:
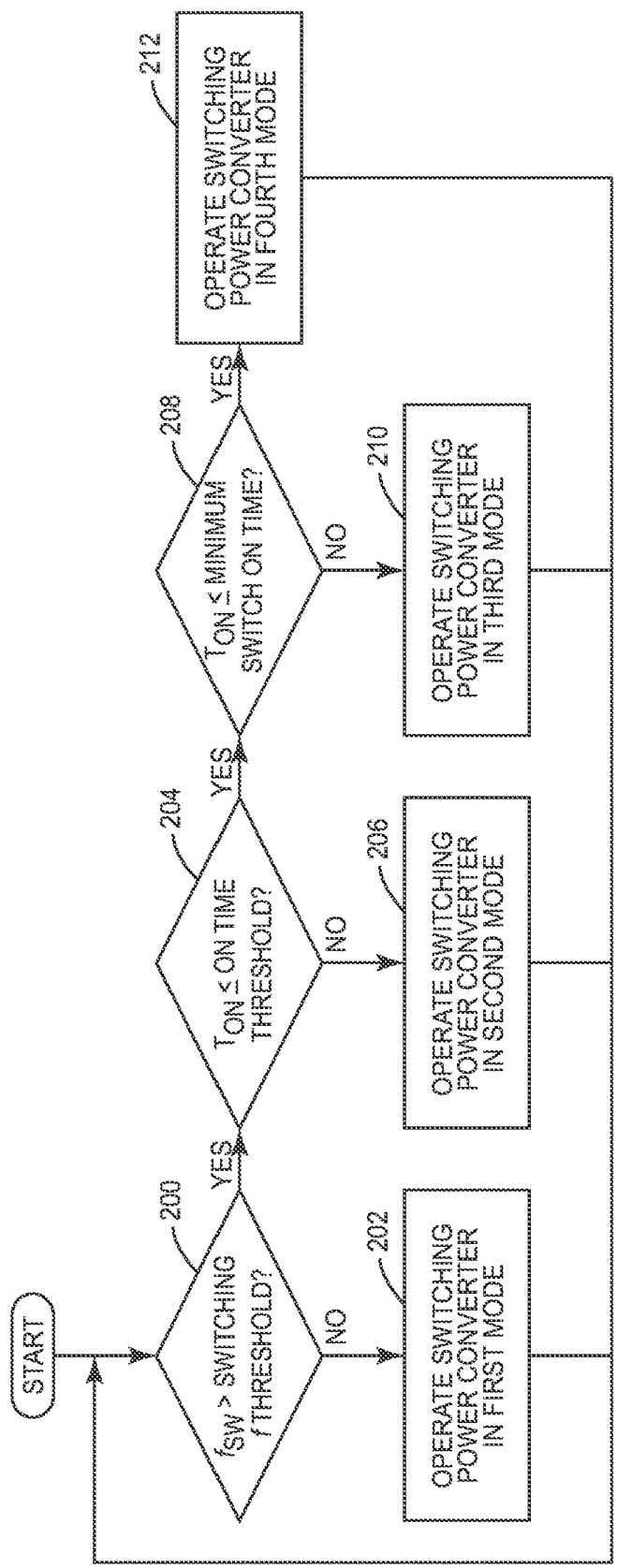
FIG. 8 is a diagram illustrating a control scheme for power converter circuitry according to one embodiment of the present disclosure.

As discussed above, conventional methods for controlling switching power converters with digital control circuitry are often incompatible with switching power converters used for LED lights due to the wide range of output voltage and/or output current required thereby. Accordingly, FIG. 8 shows a control scheme utilized by the power converter control circuitry 58 to control the state of the switch 66 according to one embodiment of the present disclosure. This control scheme may be implemented in the dimming module 106 discussed above with respect to FIG. 7. After starting, it is first determined whether a switching frequency $f_{sw}$ of the switch 66 is above a switching frequency threshold (step 200). If the switching frequency $f_{sw}$ of the switch 66 is not above the switching frequency threshold, the switching power converter 52 is operated in a first mode of operation (step 202). In the first mode of operation, the switching control signal SC (and thus the gate drive signal GD) are provided such that the switching power converter 52 is operated in a boundary conduction mode (BCM). In the first mode, the on time of the switch 66 (i.e., the amount of time in each switching period in which the switch 66 is closed) is changed based on the desired output voltage $V_{OUT}$ and/or output current $I_{OUT}$ indicated by the control signal CNT. The power converter control circuitry 58 may take into account the input voltage $V_{IN}$ and/or input current $I_{IN}$ as well as the LED temperature $T_{LED}$ to determine the on time of the switch 66 to achieve the desired output voltage $V_{OUT}$ and/or output current $I_{OUT}$. The off time of the switch 66 is set implicitly by the amount of time it takes the primary winding current $I_{PW}$ to reach zero after the switch 66 is opened. This is indicated by the zero crossing detection signal ZCD provided to the power converter control circuitry 58 by the ZCD circuitry 56. Accordingly, the ZCD circuitry 56 is active in the first mode. When the ZCD circuitry 56 indicates that the primary winding current $I_{PW}$ has reached zero, the power converter control circuitry 58 then provides the switching control signal SC to close the switch 66 and thus begin a new switching period.

The switching frequency threshold indicates a switching speed at which the problems discussed above with respect to digital control circuitry (i.e., switching time and pulse-width modulation (PWM) resolution) become problematic in a boundary conduction mode (BCM). Up to this switching frequency threshold, the switching power converter 52 may be operated in a boundary conduction mode (BCM) without problems. In some embodiments, the switching frequency threshold is between 800 kHz and 1.2 MHz. Accordingly, when operating at full load, the switching frequency of the power converter circuitry 34 may be from hundreds of kilohertz to the single digit Megahertz range, for example between 800 kHz and 1.2 MHz, which may provide several benefits as discussed above. The particular switching speed of the power converter circuitry 34 may vary based on the input voltage $V_{IN}$, the load, and the desired dimming level.

If the switching frequency $f_{sw}$ of the switch 66 is above the switching frequency threshold, it is determined whether an on time $T_{ON}$ of the switch 66 is less than or equal to an on time threshold (step 204). As discussed above, the on time $T_{ON}$ of the switch 66 is the amount of time that the switch 66 is kept on during each switching cycle or period, where a switching cycle or period is a full cycle of the switch 66 from on to off. If the on time $T_{ON}$ of the switch 66 is not less than or equal to the on time threshold, the switching power converter 52 is operated in a second mode (step 206). In the second mode, the ZCD circuitry 56 is deactivated such that the switching power converter 52 operates in a discontinuous conduction mode (DCM). The on time $T_{ON}$ of the switch 66 is still adjusted in the second mode based on the desired output voltage $V_{OUT}$ and/or output current $I_{OUT}$ indicated by the control signal CNT, and the power converter control circuitry 58 may similarly take into account the input voltage $V_{IN}$ and/or input current $I_{IN}$ as well as the LED temperature $T_{LED}$ to determine the on time $T_{ON}$ of the switch 66 to achieve the desired output voltage $V_{OUT}$ and/or output current $I_{OUT}$. The switching frequency $f_{sw}$ and thus the switching period of the switch 66 is fixed at the switching frequency threshold in the second mode.

By switching to a discontinuous conduction mode (DCM) in the second mode, the output voltage $V_{OUT}$ and/or output current $I_{OUT}$ may be reduced while maintaining the switching frequency at the switching frequency threshold. By capping the required frequency of the switch control signal SC, the problems discussed above (i.e., switching speed and PWM resolution) are less problematic, thereby allowing the power converter control circuitry 58 to be implemented in relatively inexpensive digital hardware as discussed above. The on time threshold may indicate the switch on time at which operating in a discontinuous mode with a fixed switching period becomes problematic for digital control circuitry. In some embodiments, the on time threshold may be between 145 ns and 185 ns.

If the on time $T_{ON}$ of the switch 66 is less than or equal to the on time threshold, it is determined whether the on time $T_{ON}$ of the switch 66 is less than or equal to a minimum switch on time (step 208). If the on time $T_{ON}$ of the switch 66 is not less than or equal to the minimum switch on time (i.e., if the on time of the switch 66 is between the minimum switch on time and the on time threshold), the switching power converter 52 is operated in a third mode (step 210). In the third mode, the switching power converter 52 is also operated in a discontinuous conduction mode (DCM), however, both the on time $T_{ON}$ of the switch 66 and the switching period are adjusted to provide the desired output voltage $V_{OUT}$ and/or output current $I_{OUT}$ indicated by the control signal CNT. As discussed above, the power converter control circuitry 58 may similarly take into account the input voltage $V_{IN}$ and/or input current $I_{IN}$ as well as the LED temperature $T_{LED}$ to determine the on time $T_{ON}$ of the switch 66 to achieve the desired output voltage $V_{OUT}$ and/or output current $I_{OUT}$. In other words, both the on time and the off time of the switch 66 are controlled in the third mode, whereas only the on time of the switch 66 is controlled in the second mode with the off time being implicitly set by clamping the switching frequency at the switching frequency threshold.

By adjusting both the on time and the off time of the switch 66 in the third mode, the switching frequency $f_{sw}$ may be maintained below a threshold at which the effects of using digital control circuitry become problematic, while still allowing the switching power converter 52 to provide low output voltage $V_{OUT}$ and/or output current $I_{OUT}$ levels suitable for providing a full range of dimming in an LED light. The minimum switch on time may indicate the switch on time at which providing the switch control signal SC may become problematic for digital control circuitry. In some embodiments, the minimum switch on time is between 80 ns and 120 ns.

If the on time $T_{ON}$ of the switch 66 is less than or equal to the minimum switch on time, the switching power converter 52 is operated in a fourth mode (step 212). In the fourth mode, the on time $T_{ON}$ of the switch 66 is clamped at the minimum switch on time and the switching period (i.e., the off time of the switch 66) is adjusted to provide the desired output voltage $V_{OUT}$ and/or output current $I_{OUT}$ indicated by the control signal CNT. As discussed above, the power converter control circuitry 58 may similarly take into account the input voltage $V_{IN}$ and/or input current $I_{IN}$ as well as the LED temperature $T_{LED}$ to determine the on time $T_{ON}$ of the switch 66 to achieve the desired output voltage $V_{OUT}$ and/or output current $I_{OUT}$.

At some point in the third mode, the on time of the switch 66 will become sufficiently low to cause problems for digital control circuitry providing the switch control signal SC. That is, as the on time of the switch decreases to provide lower output voltage $V_{OUT}$ and/or output current $I_{OUT}$, the frequency of the switch control signal SC must increase. As discussed above, this may cause problems when the PWM resolution of the power converter control circuitry 58 is below a threshold value. Accordingly, in the fourth mode the on time $T_{ON}$ of the switch 66 is clamped, and the off time of the switch 66 is adjusted to achieve a desired level of the output voltage $V_{OUT}$ and/or output current $I_{OUT}$ suitable for full range dimming of an LED light.

The entire process described above is continuously looped to determine the proper mode based on the current switching frequency and switch on time. In various embodiments, hysteresis is added into the control loop in order to prevent undesired mode while the switching frequency and/or the switch on time settles after adjustment.

By using the techniques described above, a relatively inexpensive microcontroller or other digital device may be used for the power converter control circuitry 58. For example, the power converter control circuitry 58 may be implemented in an Atmel ATSAMD21E16L. As discussed above, this may significantly simplify the design of the power converter circuitry 34 and decrease the size thereof. Further, operating the power converter circuitry 34 in the manner described above may enable a reduction in the size of the components therein, such that an area of the power converter circuitry 34 is less than 6.50 in² and a volume of the power converter circuitry 34 is less than 3.50 in³ while maintaining a power density of at least 8.00 W/in³ and in some embodiments greater than 9.00 W/in³ at 30 W. This is due to the relatively high frequency of operation of the power converter circuitry 34 compared to conventional approaches. In various embodiments, a voltage of the AC input power source $AC_{IN}$ may be between 120-277 V provided at either 50 Hz or 60 Hz.

Those skilled in the art will recognize improvements and modifications to the preferred embodiments of the present disclosure. All such improvements and modifications are considered within the scope of the concepts disclosed herein and the claims that follow.

What is claimed is:

1. Control circuitry for a switching power converter comprising:
   processing circuitry; and
   a memory storing instructions which, when executed by the processing circuitry cause the control circuitry to:
     provide a power converter control signal to the switching power converter in order to operate the switching power converter in a boundary conduction mode when a switching frequency of a switch in the switching power converter is below a switching frequency threshold such that an on time of the switch is adjusted based on a desired output power of the switching power converter; and
     provide the power converter control signal to the switching power converter in order to operate the switching power converter in a discontinuous conduction mode when the switching frequency of the switch is above the switching frequency threshold such that one or more of the on time of the switch and a switching period of the switch are adjusted based on the desired output power of the switching power converter and the on time of the switch is clamped at a minimum switch on time.

2. The control circuitry of claim 1 wherein the control circuitry is configured to provide the power converter control signal to the switching power converter in order to operate the switching power converter in the discontinuous conduction mode such that:
when the on time of the switch is above a switch on time threshold, the on time of the switch is adjusted based on the desired output of the switching power converter;
when the on time of the switch is below the on time threshold and above the minimum switch on time, the on time of the switch and the switching period of the switch are adjusted based on the desired output power of the switching power converter; and
when the on time of the switch is equal to or below the minimum switch on time, the on time of the switch is clamped at the minimum switch on time and the switching period of the switch is adjusted based on the desired output power of the switching power converter.

3. The control circuitry of claim 2 wherein the switch is formed from a semiconductor material with a bandgap greater than 2 eV.

4. The control circuitry of claim 2 wherein the switching frequency threshold is between 800 kHz and 1 MHz.

5. The control circuitry of claim 4 wherein the minimum switch on time is between 80 ns and 120 ns.

6. The control circuitry of claim 5 wherein the on time threshold is between 145 ns and 185 ns.

7. Power converter circuitry comprising:
a switching power converter comprising a switch and configured to receive a power supply signal and provide an output power signal; and
control circuitry coupled to the switch and comprising:
processing circuitry; and
a memory storing instructions which, when executed by the processing circuitry cause the control circuitry to:
provide a power converter control signal to the switch in order to operate the switching power converter in a boundary conduction mode when a switching frequency of the switch in the switching power converter is below a switching frequency threshold such that an on time of the switch is adjusted based on a desired output power of the switching power converter; and
provide the power converter control signal to the switch in order to operate the switching power converter in a discontinuous conduction mode when the switching frequency of the switch is above the switching frequency threshold such that one or more of the on time of the switch and a switching period of the switch are adjusted based on the desired output power of the switching power converter and the on time of the switch is clamped at a minimum switch on time.

8. The power converter circuitry of claim 7 wherein the control circuitry is configured to provide the power converter control signal to the switch in order to operate the switching power converter in the discontinuous conduction mode such that:
when the on time of the switch is above a switch on time threshold, the on time of the switch is adjusted based on the desired output of the switching power converter;
when the on time of the switch is below the switch on time threshold and above the minimum switch on time, the on time of the switch and the switching period of the switch are adjusted based on the desired output power of the switching power converter; and
when the on time of the switch is equal to or below the minimum switch on time, the on time of the switch is clamped at the minimum switch on time and the switching period of the switch is adjusted based on the desired output power of the switching power converter.

9. The power converter circuitry of claim 8 wherein the switching power converter is a single-ended primary-inductor converter (SEPIC).

10. The power converter circuitry of claim 9 wherein the switch is formed from a semiconductor material with a bandgap greater than 2 eV.

11. The power converter circuitry of claim 8 wherein the switching frequency threshold is between 800 kHz and 1 MHz.

12. The power converter circuitry of claim 11 wherein the minimum switch on time is between 80 ns and 120 ns.

13. The power converter circuitry of claim 12 wherein the on time threshold is between 145 ns and 185 ns.

14. The power converter circuitry of claim 8 wherein the output power signal is configured to drive one or more light-emitting diodes (LEDs).

15. A method of operating a switching power converter comprising:
operating the switching power converter in a boundary conduction mode when a switching frequency of a switch in the switching power converter is below a switching frequency threshold such that an on time of the switch is adjusted based on a desired output power of the switching power converter; and
operating the switching power converter in a discontinuous conduction mode when the switching frequency of the switch is above the switching frequency threshold such that one or more of the on time of the switch and a switching period of the switch are adjusted based on the desired output power of the switching power converter and the on time of the switch is clamped at a minimum switch on time.

16. The method of claim 15 wherein the switching power converter is operated in the discontinuous conduction mode such that:
when the on time of the switch is above a switch on time threshold, the on time of the switch is adjusted based on the desired output power of the switching power converter;
when the on time of the switch is below the on time threshold and above the minimum switch on time, the on time of the switch and the switching period of the switch are adjusted based on the desired output power of the switching power converter; and
when the on time of the switch is equal to or below the minimum switch on time, the on time of the switch is clamped at the minimum switch on time and the switching period of the switch is adjusted based on the desired output power of the switching power converter.

17. The method of claim 16 wherein the switch is formed from a semiconductor material with a bandgap greater than 2 eV.

18. The method of claim 16 wherein the switching frequency threshold is between 800 kHz and 1 MHz.

19. The method of claim 18 wherein the minimum switch on time is between 80 ns and 120 ns.

20. The method of claim 19 wherein the on time threshold is between 145 ns and 185 ns.

* * * * *

UNITED STATES PATENT AND TRADEMARK OFFICE
CERTIFICATE OF CORRECTION

PATENT NO. : 10,517,152 B2
APPLICATION NO. : 15/352062
DATED : December 24, 2019
INVENTOR(S) : Ashish Ekbote and Noe Gonzalez Page 1 of 1

It is certified that error appears in the above-identified patent and that said Letters Patent is hereby corrected as shown below:

In the Specification

In Column 7, Line 12, replace "LED temperature $T_{EED}$" with --LED temperature $T_{LED}$--.
In Column 7, Line 13, replace "input current 6" with --input current $I_{IN}$--.
In Column 10, Line 13, replace "input current 6" with --input current $I_{IN}$--.

Signed and Sealed this
Eleventh Day of February, 2020

Andrei Iancu
*Director of the United States Patent and Trademark Office*